US012561856B2

(12) United States Patent
Jang et al.

(10) Patent No.: US 12,561,856 B2
(45) Date of Patent: Feb. 24, 2026

(54) SYSTEM AND METHOD FOR SPLIT-RENDERING FOR PERSONS WITH COLOR WEAKNESS

(71) Applicant: KOREA ELECTRONICS TECHNOLOGY INSTITUTE, Seongnam-si (KR)

(72) Inventors: Jun Hwan Jang, Paju-si (KR); Woo Chool Park, Incheon (KR); Min Su Choi, Seoul (KR); Jun Suk Lee, Seoul (KR); Bon Jae Koo, Suwon-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 174 days.

(21) Appl. No.: 18/498,589

(22) Filed: Oct. 31, 2023

(65) Prior Publication Data
US 2024/0221244 A1 Jul. 4, 2024

(30) Foreign Application Priority Data
Dec. 28, 2022 (KR) ........................ 10-2022-0188009

(51) Int. Cl.
*G06T 5/00* (2024.01)
*G06T 11/00* (2006.01)
*G06V 10/56* (2022.01)

(52) U.S. Cl.
CPC ............ *G06T 11/001* (2013.01); *G06V 10/56* (2022.01)

(58) Field of Classification Search
CPC ................................ G06V 10/56; A61B 3/066
USPC ......................................................... 345/589
See application file for complete search history.

(56) References Cited

U.S. PATENT DOCUMENTS

| | | | | |
|---|---|---|---|---|
| 2013/0335435 A1* | 12/2013 | Ambrus | ................. | A61B 3/066 |
| | | | | 345/589 |
| 2016/0155344 A1* | 6/2016 | Mihai | ................... | G06F 40/151 |
| | | | | 351/242 |
| 2022/0172440 A1* | 6/2022 | Budagavi | ............. | H04N 21/816 |

FOREIGN PATENT DOCUMENTS

KR 10-2005-0044114 A 5/2005

* cited by examiner

*Primary Examiner* — Samantha (Yuehan) Wang
(74) *Attorney, Agent, or Firm* — Knobbe, Martens, Olson & Bear, LLP

(57) ABSTRACT

A system and a method for split-rendering for persons with color weakness are proposed. The split-rendering method may include, by a service server, in response to a login of a user device, loading a color weakness profile corresponding to a user of the logging-in user device. The method may also include, by the service server, in response to the user being color-weak in accordance with the loaded color weakness profile, selecting one of a plurality of split-rendering servers. The method may further include, by the service server, transmitting a video content along with the color weakness profile to the selected split-rendering server, and by the service server, transmitting access information about the selected split-rendering server to the user device.

8 Claims, 7 Drawing Sheets

SYSTEM AND METHOD FOR SPLIT-RENDERING FOR PERSONS WITH COLOR WEAKNESS

CROSS REFERENCE TO RELATED APPLICATIONS

The present application claims priority to Korean Patent Application No. 10-2022-0188009 filed Dec. 28, 2022, the entire contents of which are incorporated herein for all purposes by this reference.

BACKGROUND

Technical Field

The present disclosure relates to image rendering technology, and more specifically, to a system and method for split-rendering for persons with color weakness.

Description of Related Technology

Recently, with the rapid development of graphics acceleration hardware such as graphics processing unit (GPU) and the advancement of 3D engine technology, it has become possible to create increasingly realistic virtual worlds and objects. In line with this, manufacturers are putting a lot of effort into maximizing performance and efficiency to provide better game screens and simulation effects.

SUMMARY

One aspect is a system and method for split-rendering for persons with color weakness.

Another aspect is a method for split-rendering for persons with color weakness includes, by a service server, upon a login of a user device, loading a color weakness profile corresponding to a user of the logging-in user device; by the service server, if the user is color-weak in accordance with the loaded color weakness profile, selecting one of a plurality of split-rendering servers; by the service server, transmitting a video content along with the color weakness profile to the selected split-rendering server; and by the service server, transmitting access information about the selected split-rendering server to the user device.

This method may further include, by the selected split-rendering server, generating a color-corrected video by rendering the received video content so that a screen with a color suitable for the user of the user device is configured based on the received color weakness profile; and by the user device, accessing the selected split-rendering server based on the access information and receiving the color-corrected video from the selected split-rendering server.

This method may further include, before loading the color weakness profile, by the service server, performing a color weakness test at an initial login of the user device; and by the service server, storing results of the color weakness test as the color weakness profile.

This method may further include, after the user device receives the color-corrected video, by the service server, updating the color weakness profile by re-performing the color weakness test in response to a request of the user device; by the service server, transmitting the updated color weakness profile to the selected split-rendering server; by the selected split-rendering server, generating a color-corrected video again by rendering the video content based on the updated color weakness profile; and by the selected split-rendering server, transmitting the color-corrected video regenerated based on the updated color weakness profile to the user device.

Another aspect is a split-rendering method for persons with color weakness that includes, by a service server, performing a color weakness test at an initial login of the user device; by the service server, storing results of the color weakness test as the color weakness profile; by the service server, upon a login of a user device, loading a color weakness profile corresponding to a user of the logging-in user device; by the service server, if the user is color-weak in accordance with the loaded color weakness profile, selecting one of a plurality of split-rendering servers; by the service server, transmitting a video content along with the color weakness profile to the selected split-rendering server; and by the service server, transmitting access information about the selected split-rendering server to the user device.

This method may further include, by the selected split-rendering server, generating a color-corrected video by rendering the received video content so that a screen with a color suitable for the user of the user device is configured based on the received color weakness profile; and by the user device, accessing the selected split-rendering server based on the access information and receiving the color-corrected video from the selected split-rendering server.

This method may further include, after the user device receives the color-corrected video, by the service server, updating the color weakness profile by re-performing the color weakness test in response to a request of the user device.

This method may further include, by the service server, transmitting the updated color weakness profile to the selected split-rendering server; by the selected split-rendering server, generating a color-corrected video again by rendering the video content based on the updated color weakness profile; and by the selected split-rendering server, transmitting the color-corrected video regenerated based on the updated color weakness profile to the user device.

Another aspect is a system for split-rendering for persons with color weakness that includes a plurality of split-rendering servers and a service server. The service server is configured to, upon a login of a user device, load a color weakness profile corresponding to a user of the logging-in user device, if the user is color-weak in accordance with the loaded color weakness profile, to select one of the plurality of split-rendering servers, to transmit a video content along with the color weakness profile to the selected split-rendering server, and to transmit access information about the selected split-rendering server to the user device.

In this system, the selected split-rendering server may be configured to generate a color-corrected video by rendering the received video content so that a screen with a color suitable for the user of the user device is configured based on the received color weakness profile, and when the user device accesses the selected split-rendering server based on the access information, to transmit the color-corrected video to the accessing user device.

In this system, the service server may be further configured to perform a color weakness test at an initial login of the user device, and to store results of the color weakness test as the color weakness profile.

In this system, the service server may be further configured to update the color weakness profile by re-performing the color weakness test in response to a request of the user device, and to transmit the updated color weakness profile to the selected split-rendering server. In addition, the selected split-rendering server may be further configured to generate a color-corrected video again by rendering the video content based on the updated color weakness profile, and to transmit the color-corrected video regenerated based on the updated color weakness profile to the user device.

Another aspect is a split-rendering system for persons with color weakness that includes a plurality of split-rendering servers and a service server. The service server is configured to perform a color weakness test at an initial login of the user device, to store results of the color weakness test as the color weakness profile, upon a login of a user device, to load a color weakness profile corresponding to a user of the logging-in user device, if the user is color-weak in accordance with the loaded color weakness profile, to select one of the plurality of split-rendering servers, to transmit a video content along with the color weakness profile to the selected split-rendering server, and to transmit access information about the selected split-rendering server to the user device.

In this system, the selected split-rendering server may be configured to generate a color-corrected video by rendering the received video content so that a screen with a color suitable for the user of the user device is configured based on the received color weakness profile, and when the user device accesses the selected split-rendering server based on the access information, to transmit the color-corrected video to the accessing user device.

In this system, the service server may be further configured to update the color weakness profile by re-performing the color weakness test in response to a request of the user device, and to transmit the updated color weakness profile to the selected split-rendering server.

In this system, the selected split-rendering server may be further configured to generate a color-corrected video again by rendering the video content based on the updated color weakness profile, and transmit the color-corrected video regenerated based on the updated color weakness profile to the user device.

According to the present disclosure, it is possible to provide a color-corrected video to color-weak persons for real-time interactive contents regardless of the type of platform. A content developer can provide a normal video to users with color weakness without investing additional development resources. Since the work is performed at the split-rendering server plug-in level, the solution can be applied if a 3D engine is used regardless of the type of 3D content. In addition, users can be provided color-corrected videos without purchasing a separate device or terminal. The color weakness test is provided using the web provided by the login server, and since the finally received content is general 2D content with color corrected, a separate device is not required, which can reduce the user's burden. Further, it can help expand the market by allowing color-weak users to enjoy content, such as Metaverse, that interacts with users and creates videos in real time.

DETAILED DESCRIPTION

Figure 1:
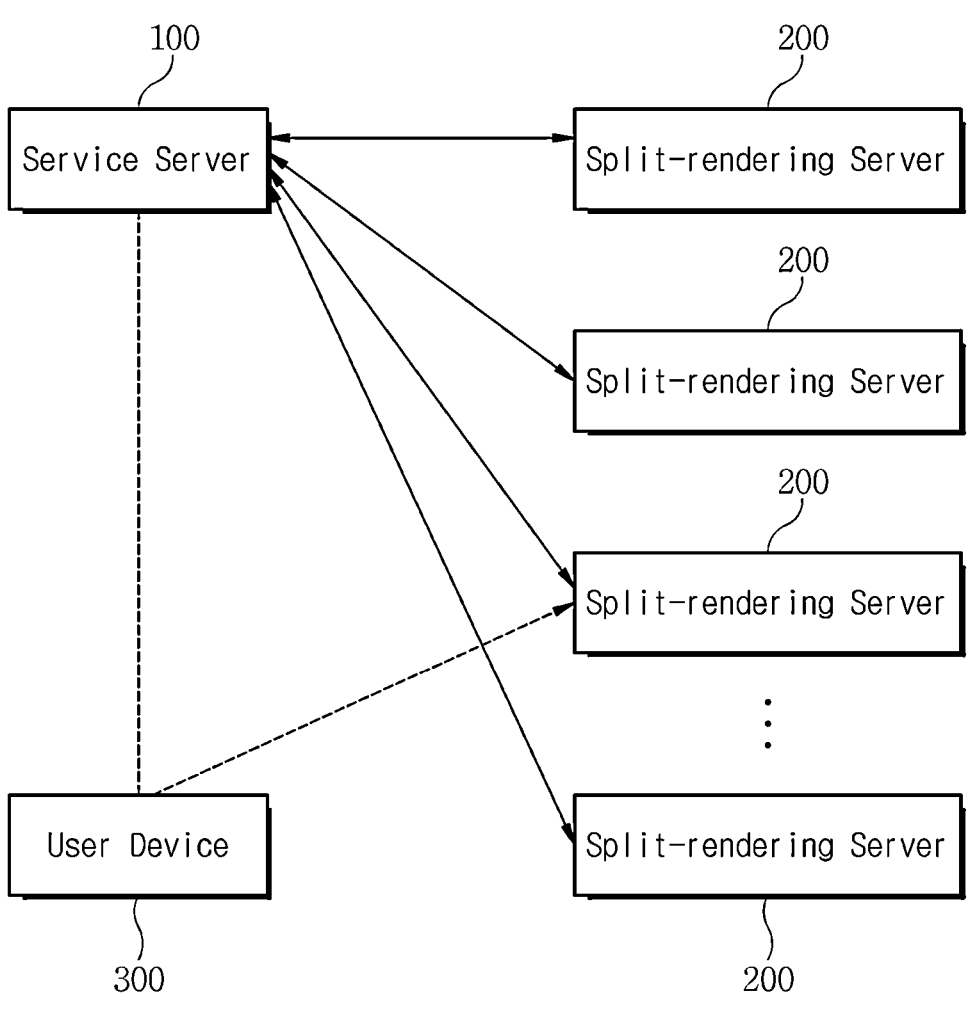
FIG. 1 is a diagram illustrating a system for split-rendering for persons with color weakness according to an embodiment of the present disclosure.

No additions/changes or improvements to/in contents for persons with color weakness have been made. Although functions such as a color adjustment mode for color-weak gamers have only started being added to games in the past few years, they are still not working perfectly. In the case of color weakness, the colors to which each patient is less sensitive are different, and their intensity is also different. Thus, it is not easy to configure and provide a screen with appropriate colors to suit each user. To avoid this problem, methods that do not use specific colors are being applied, but due to the nature of video media in which various colors appear, there is no fundamental solution.

To solve such issues, a method of outputting corrected colors on the final display using a correction algorithm for each color has been proposed. However, this method is a solution that can be used on a device that receives TV videos, and needs a separate device or platform at the user end. Therefore, it is not easy to access and apply this method on modern media content consumption platforms such as mobile phones, tablets, and PCs.

Now, embodiments of the present disclosure will be described in detail with reference to the accompanying drawings. However, in the following description and the accompanying drawings, well known techniques may not be described or illustrated in detail to avoid obscuring the subject matter of the present disclosure. Through the drawings, the same or similar reference numerals denote corresponding features consistently.

The terms and words used in the following description, drawings and claims are not limited to the bibliographical meanings thereof and are merely used by the inventor to enable a clear and consistent understanding of the disclosure. Thus, it will be apparent to those skilled in the art that the following description about various embodiments of the present disclosure is provided for illustration purpose only and not for the purpose of limiting the disclosure as defined by the appended claims and their equivalents.

Additionally, the terms including expressions "first", "second", etc. are used for merely distinguishing one element from other elements and do not limit the corresponding elements. Also, these ordinal expressions do not intend the sequence and/or importance of the elements.

Further, when it is stated that a certain element is "coupled to" or "connected to" another element, the element may be logically or physically coupled or connected to another element. That is, the element may be directly coupled or connected to another element, or a new element may exist between both elements.

In addition, the terms used herein are only examples for describing a specific embodiment and do not limit various embodiments of the present disclosure. The singular expressions may include plural expressions unless the context clearly dictates otherwise. Also, the terms "comprise", "include", "have", and derivatives thereof refer to inclusion without limitation. That is, these terms are intended to specify the presence of features, numerals, steps, operations, elements, components, or combinations thereof, which are disclosed herein, and should not be construed to preclude the presence or addition of other features, numerals, steps, operations, elements, components, or combinations thereof.

In addition, the terms such as "unit" and "module" used herein refer to a unit that processes at least one function or operation and may be implemented with hardware, software, or a combination of hardware and software.

In addition, the terms "a", "an", "one", "the", and similar terms are used herein in the context of describing the present disclosure (especially in the context of the following claims) may be used as both singular and plural meanings unless the context clearly indicates otherwise.

Also, embodiments within the scope of the present disclosure include computer-readable media having computer-executable instructions or data structures stored on computer-readable media. Such computer-readable media can be any available media that is accessible by a general purpose or special purpose computer system. By way of example, such computer-readable media may include, but not limited to, RAM, ROM, EPROM, CD-ROM or other optical disk storage, magnetic disk storage or other magnetic storage devices, or any other physical storage medium that can be used to store or deliver certain program codes formed of computer-executable instructions, computer-readable instructions or data structures and which can be accessed by a general purpose or special purpose computer system.

In the description and claims, the term "network" is defined as one or more data links that enable electronic data to be transmitted between computer systems and/or modules. When any information is transferred or provided to a computer system via a network or other (wired, wireless, or a combination thereof) communication connection, this connection can be understood as a computer-readable medium. The computer-readable instructions include, for example, instructions and data that cause a general purpose computer system or special purpose computer system to perform a particular function or group of functions. The computer-executable instructions may be binary, intermediate format instructions, such as, for example, an assembly language, or even source code.

In addition, the present disclosure may be applied in network computing environments having various types of computer system configurations such as PCs, laptop computers, handheld devices, multiprocessor systems, microprocessor-based or programmable consumer electronics, network PCs, minicomputers, mainframe computers, mobile phones, PDAs, pagers, and the like. The present disclosure may also be implemented in distributed system environments where both local and remote computer systems linked by a combination of wired data links, wireless data links, or wired and wireless data links through a network perform tasks. In such distributed system environments, program modules may be located in local and remote memory storage devices.

At the outset, a system for split-rendering for persons with color weakness according to an embodiment of the present disclosure will be described. FIG. 1 is a diagram illustrating a system for split-rendering for persons with color weakness according to an embodiment of the present disclosure.

Referring to FIG. 1, the split-rendering system according to an embodiment of the present disclosure includes a service server 100, a plurality of split-rendering servers 200, and a user device 300.

The user device 300 refers to an electronic device that accesses the service server 100 or the split-rendering server 200 through a wired or wireless network, receives video content, and displays or plays the received video content. Typically, the user device 300 may be a personal computer (PC), a smart phone, etc.

The service server 100 and the plurality of split-rendering servers 200 are entities on a network. The service server 100 performs a color weakness test at the initial login of the user device 300 and stores the color weakness test results as a color weakness profile. The color weakness profile includes whether the user has color weakness or not, and color vision information. The color vision information includes the user's color vision deficiency and its degree. The color weakness test may be performed using the Ishihara test.

Afterwards, when the user device 300 logs in, the service server 100 loads the color weakness profile corresponding to the user of the logging-in user device. If the user is color-weak in accordance with the loaded color weakness profile, the service server 100 selects any one of the plurality of split-rendering servers 200 and delivers video content along with the color weakness profile to the selected split-rendering server 200. In addition, the service server 100 transmits access information about the selected split-rendering server 200 to the user device 300.

Upon receiving the video content and the color weakness profile, the selected split-rendering server 200 generates a color-corrected video by rendering the received video content so that a screen with a color suitable for the user of the user device 300 is configured based on the received color weakness profile. Thereafter, in response to access of the user device 300 based on the access information, the selected split-rendering server 200 provides the color-corrected video to the user device 300.

Upon receiving the color-corrected video, the user device 300 outputs the received color-corrected video on the screen. Sometimes, the user may not be satisfied with the color-corrected video displayed on the screen. In this case, the user may request retest through the user device 300. That is, based on a user's input, the user device 300 can access the service server 100 and request a color weakness test. Then, the service server 100 can re-perform the color weakness test. Thus, the service server 100 updates the color weakness profile and sends the updated color weakness profile to the split-rendering server 200. Then, the split-rendering server 200 generates a color-corrected video again by rendering the video content based on the updated color weakness profile. Then, the split-rendering server 200 transmits the color-corrected video regenerated based on the updated color weakness profile to the user device 300.

Figure 2:
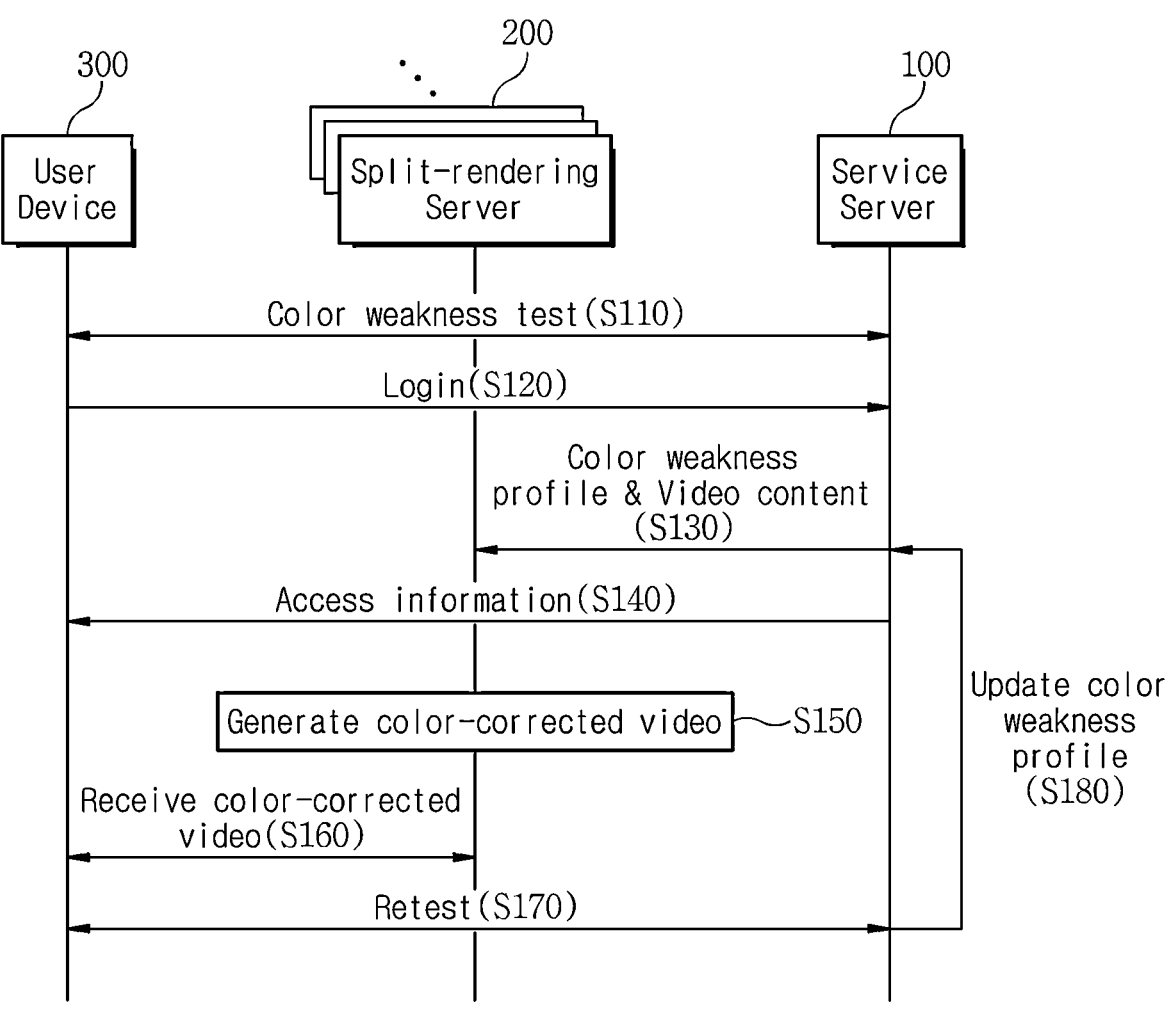
FIG. 2 is a diagram illustrating a method for split-rendering for persons with color weakness according to an embodiment of the present disclosure.
Figure 3:
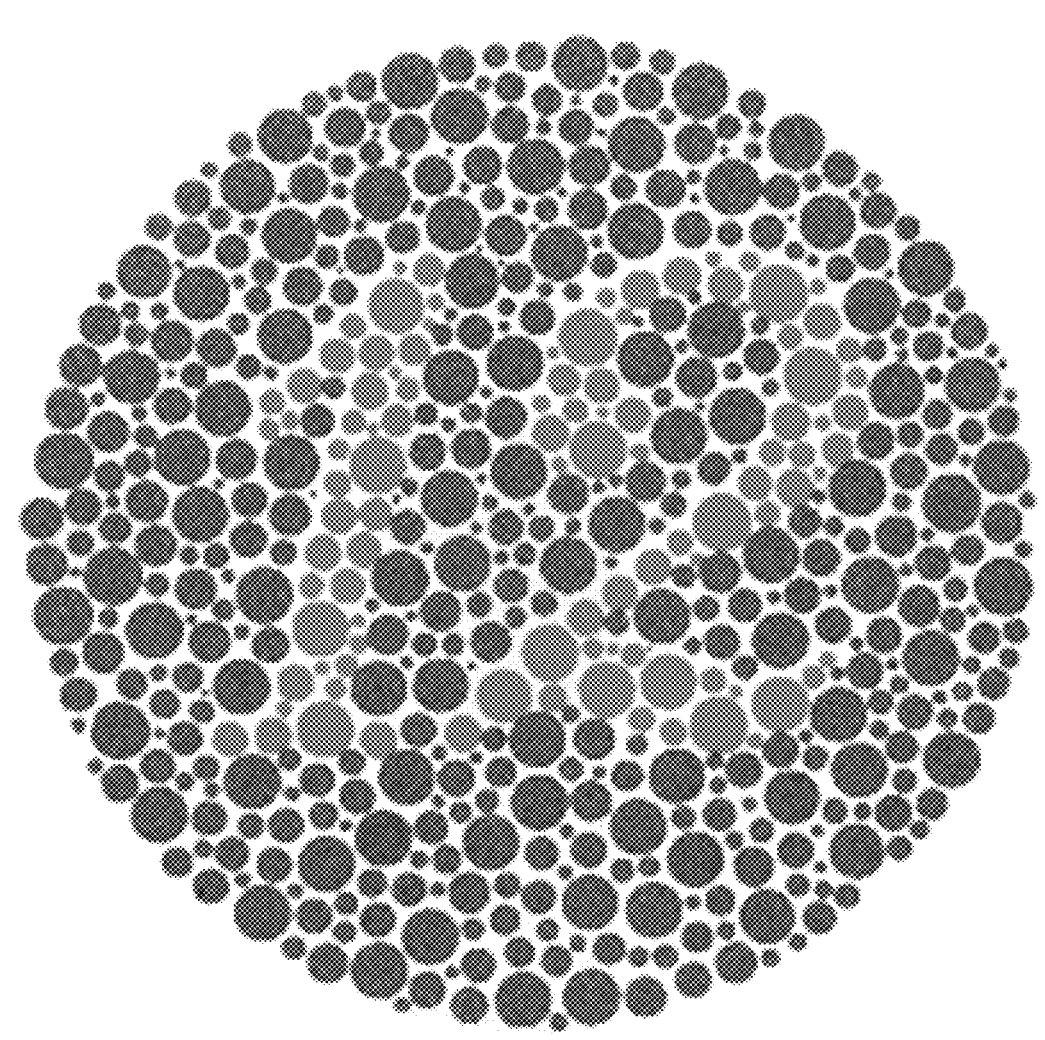
FIGS. 3 to 7 are diagrams illustrating a color vision defect checklist used for the system and method according to an embodiment of the present disclosure.
Figure 4:
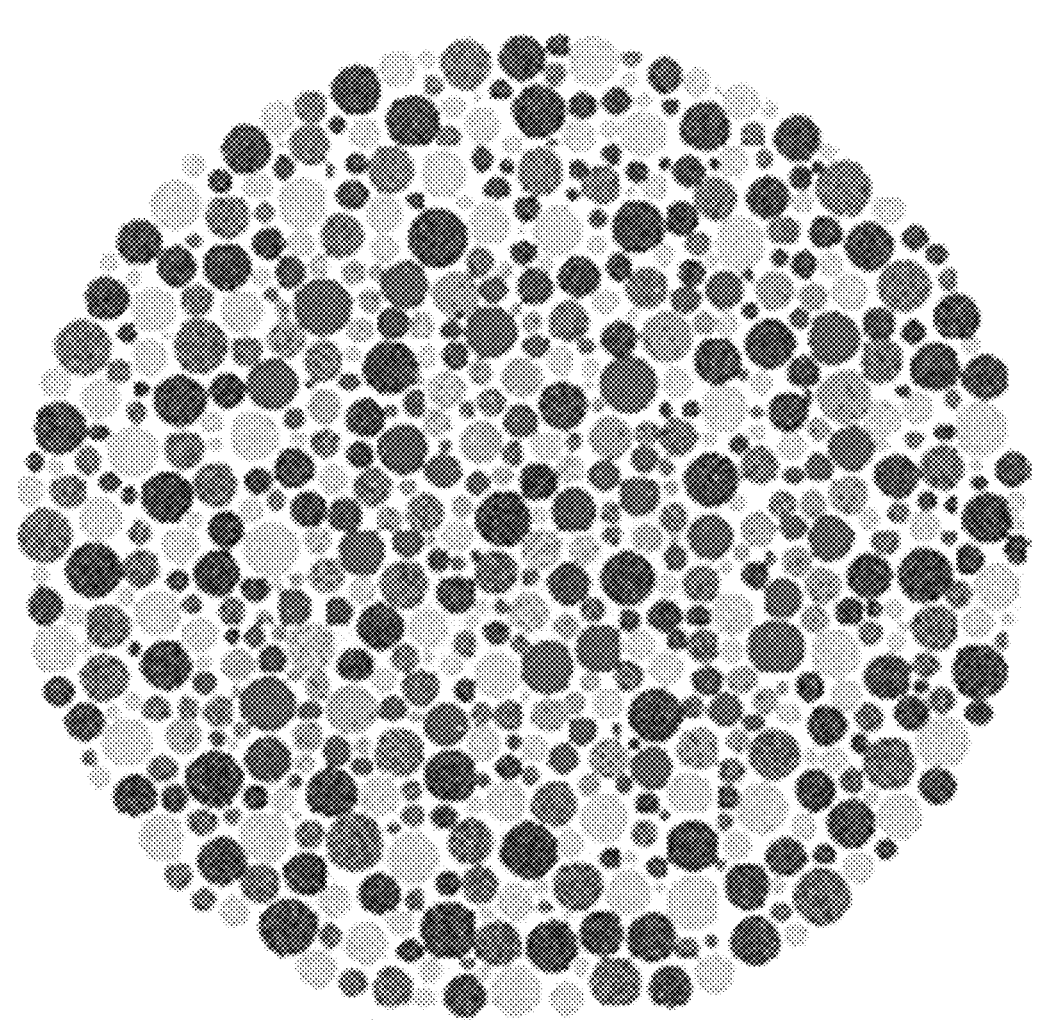
Figure 5:
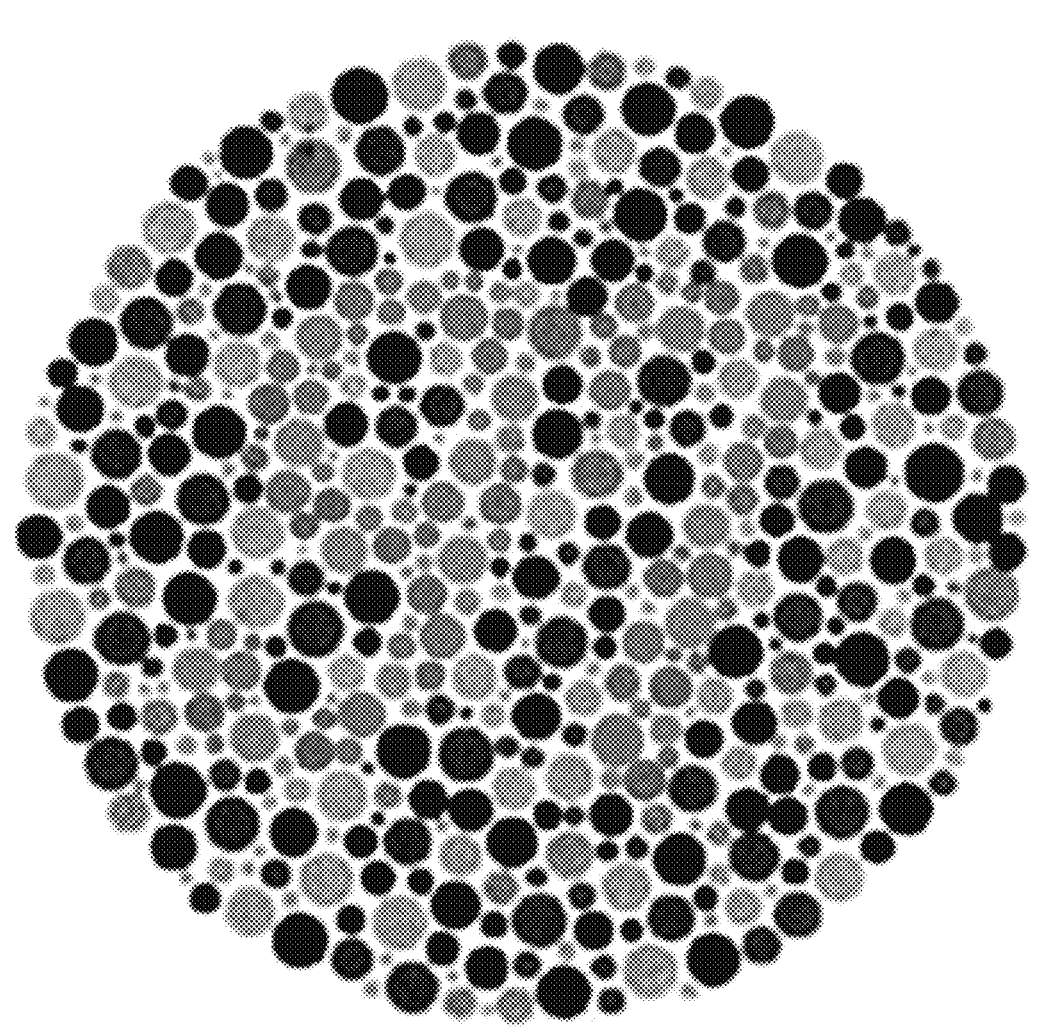
Figure 6:
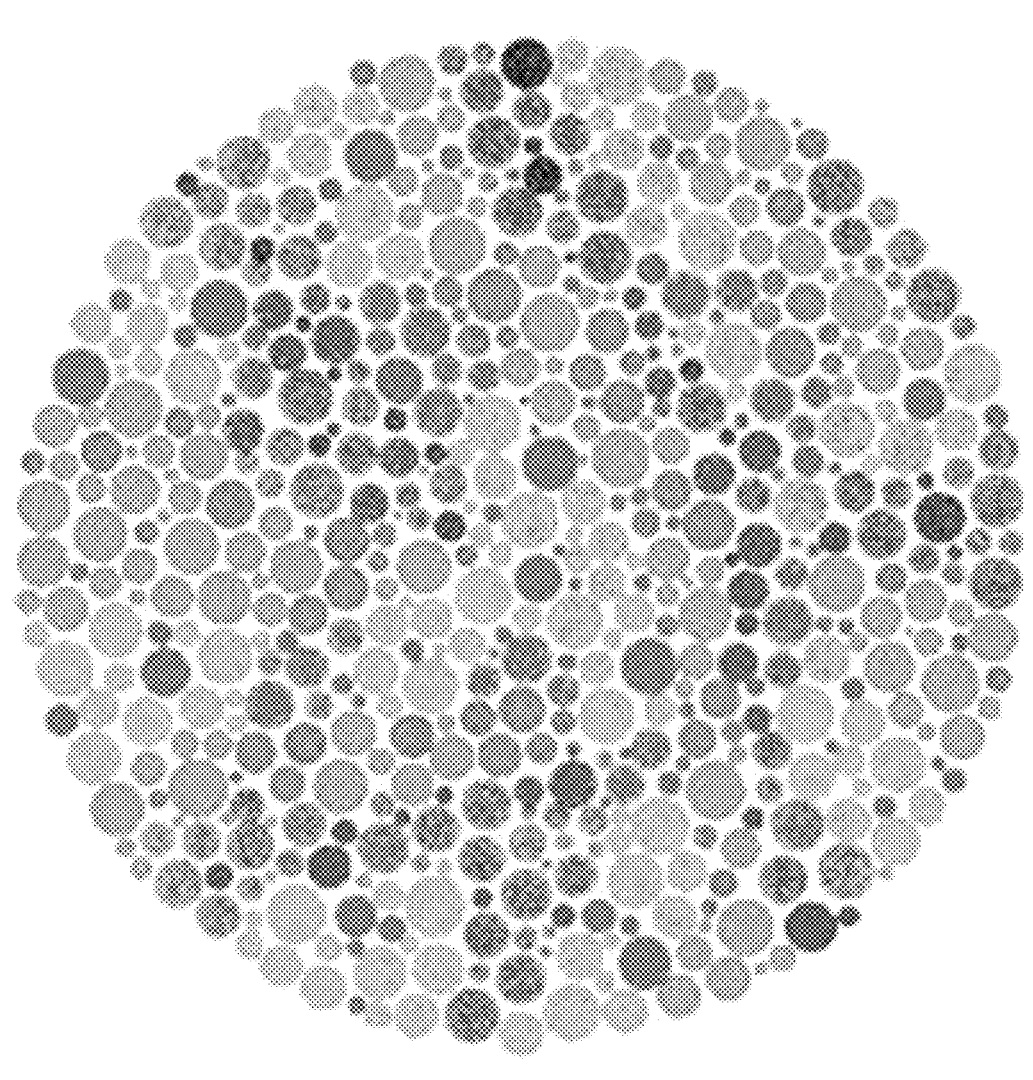
Figure 7:
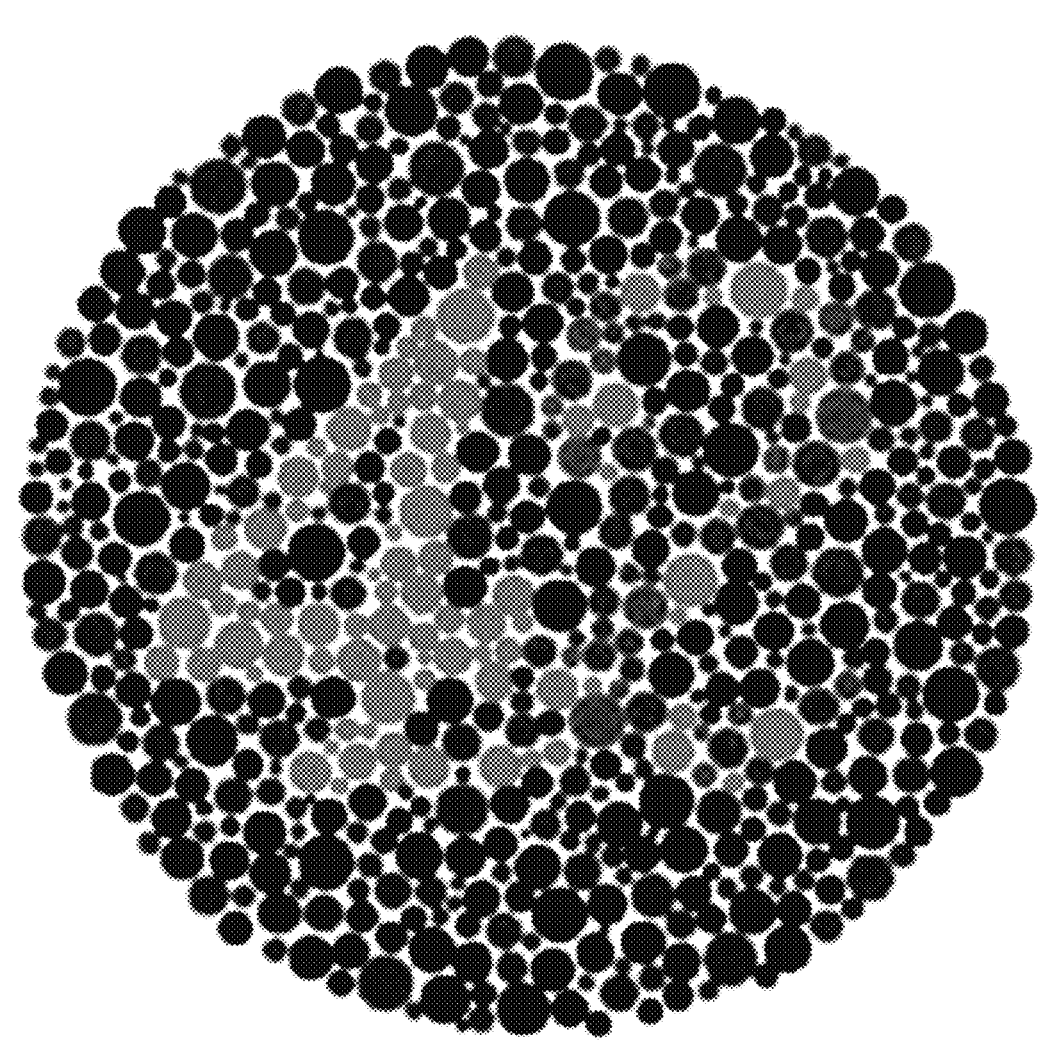

Next, a split-rendering method for persons with color weakness according to an embodiment of the present disclosure will be described. FIG. 2 is a diagram illustrating a method for split-rendering for persons with color weakness according to an embodiment of the present disclosure. FIGS. 3 to 7 are diagrams illustrating a color vision defect checklist used for the system and method according to an embodiment of the present disclosure.

Referring to FIG. 2, at step S110, the service server 100 performs a color weakness test at the initial login of the user device 300 and stores the color weakness test results as a color weakness profile. The color weakness profile includes whether the user has color weakness or not, and color vision information. The color vision information includes the user's color vision deficiency and its degree. The color weakness test may be performed using the Ishihara test. For example, the service server 100 provides the user device 300 with a color vision defect checklist as shown in FIGS. 3 to 7, queries the user device 300 to input a visible number or letter, and receives a response to the query from the user device 300. For quick progress, the service server 100 may provide two images for each test type to respond to a total of 10 inquiries. After the test, the service server 100 may provide a sample video by rendering it appropriately for the user according to the test results. If the provided video is not properly corrected, the service server 100 may perform the test again in response to a user's input.

Next, at step S120, the user device 300 may log in to the service server 100 to receive video content. Upon the login of the user device 300, the service server 100 loads the color weakness profile corresponding to the user of the logging-in user device.

Then, if the user is color-weak in accordance with the loaded color weakness profile, the service server 100 selects one of the plurality of split-rendering servers 200 at step S130 and transmits the video content along with the color weakness profile to the selected split-rendering server 200.

In addition, at step S104, the service server 100 transmits access information about the selected split-rendering server 200 to the user device 300.

Meanwhile, upon receiving the video content and the color weakness profile, the selected split-rendering server 200 generates a color-corrected video at step S150 by rendering the received video content so that a screen with a color suitable for the user of the user device 300 is configured based on the received color weakness profile.

On the other hand, at step S160, the user device 300 accesses the selected split-rendering server 200 based on the access information and receives the color-corrected video from the selected split-rendering server 200. That is, the selected split-rendering server 200 provides the color-corrected video to the accessing user device 300.

Upon receiving the color-corrected video, the user device 300 outputs the received color-corrected video on the screen. Sometimes, the user may not be satisfied with the color-corrected video displayed on the screen. In this case, the user may request retest through the user device 300. That is, based on a user's input, the user device 300 can access the service server 100 and request a color weakness test. Then, at the step S170, the service server 100 can re-perform the color weakness test. Thus, the service server 100 updates the color weakness profile at step S180.

As the color weakness profile is updated, the above-described steps S130, S150, and S160 may be repeated. In this case, the step S140 is omitted. That is, the service server 100 transmits the updated color weakness profile to the selected split-rendering server 200 at the step S130, and the selected split-rendering server 200 generates a color-corrected video again at the step S150 by rendering the video content based on the updated color weakness profile. Then, at step S160, the selected split-rendering server 200 may transmit the color-corrected video regenerated based on the updated color weakness profile to the user device 300. In this way, updating the color weakness profile and tuning the color-corrected video can be repeatedly performed at user's request The present disclosure targets video content that requires high specifications enough to use split-rendering. Split-rendering technology is generally used to reduce the load on the end user's device, so it is not suitable for general 2D movie or drama. In case of movie or drama, video is not created in real time, and a video file has already been divided to suit a service after rendering and encoding processes. In this state, the only way is to correct it at the display stage. However, in case of content that communicates two-way with the user, because it is created by rendering video in real time, color correction technology can be applied at the split-rendering stage.

According to the present disclosure, it is possible to provide a color-corrected video to color-weak persons for real-time interactive contents regardless of the type of platform. A content developer can provide a normal video to users with color weakness without investing additional development resources. Since the work is performed at the split-rendering server plug-in level, the solution can be applied if a 3D engine is used regardless of the type of 3D content. In addition, users can be provided color-corrected videos without purchasing a separate device or terminal. The color weakness test is provided using the web provided by the login server, and since the finally received content is general 2D content with color corrected, a separate device is not required, which can reduce the user's burden. Further, it can help expand the market by allowing color-weak users to enjoy content, such as Metaverse, that interacts with users and creates videos in real time.

While this specification contains many specific implementation details, these should not be construed as limitations on the scope of the present disclosure or of what may be claimed, but rather as descriptions of features that may be specific to particular embodiments of the disclosure. Certain features that are described herein in the context of separate embodiments can also be implemented in combination as a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although operations are illustrated as being performed in a predetermined order in the drawings, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

Certain embodiments of the subject matter of the present disclosure have been described hereinabove. Other embodiments are also within the scope of the following claims. For example, acts recited in the claims may be performed in a different order and still achieve desirable results. As an example, the processes depicted in the accompanying drawings do not necessarily require the specific illustrated order or sequential order to achieve desirable results. In certain implementations, multitasking and parallel processing may be advantageous.

This description shows the best mode of the present disclosure and provides examples to illustrate the present disclosure and to enable a person skilled in the art to make and use the present disclosure. The present disclosure is not limited by the specific terms used herein. Based on the above-described embodiments, one of ordinary skill in the art can modify, alter, or change the embodiments without departing from the scope of the present disclosure.

Accordingly, the scope of the present disclosure should not be limited by the described embodiments and should be defined by the appended claims.

What is claimed is:

1. A method for split-rendering for persons with color weakness, the method comprising:

by a service server, performing a color weakness test at an initial login of a user device;

by the service server, storing a color weakness profile of a user of the user device based on a result of the color weakness test;

by the service server, in response to a subsequent login of the user device, loading the color weakness profile corresponding to the user of the user device;

by the service server, in response to the loaded color weakness profile, selecting one of a plurality of split-rendering servers;

by the service server, transmitting a video content along with the color weakness profile to the selected split-rendering server;

by the service server, transmitting access information about the selected split-rendering server to the user device;

by the selected split-rendering server, generating a color-corrected video from the video content based on the color weakness profile; and by the selected split-rendering server, in response to accessing the selected split-rendering server using the access information by the user device, transmitting the color-corrected video to the user device, wherein the service server that provides the video content, which is not color-corrected, is a different entity from the selected split-rendering server that provides the color-corrected video.

2. The method of claim 1, further comprising:

after transmitting the color-corrected video to the user device, by the service server, updating the color weakness profile by re-performing the color weakness test in response to a request of the user device;

by the service server, transmitting the updated color weakness profile to the selected split-rendering server;

by the selected split-rendering server, regenerating a color-corrected video again by rendering the video content based on the updated color weakness profile; and by the selected split-rendering server, transmitting the regenerated color-corrected video to the user device.

3. The method of claim 1, further comprising:

by the service server, after performing the color weakness test, providing the user device with a sample video prepared by rendering based on the result of the color weakness test; and by the service server, in response to a feedback from the user device that the provided sample video is not properly corrected, repeating the color weakness test to obtain an updated test result.

4. The method of claim 1, wherein the color-corrected video comprises a real-time interactive content that communicates two-way with the user device and is created by rendering in real time by applying color correction.

5. A system for split-rendering for persons with color weakness, the system comprising:

a plurality of split-rendering servers; and a service server configured to:

perform a color weakness test at an initial login of a user device, store a color weakness profile of a user of the user device based on a result of the color weakness test, in response to a subsequent login of the user device, load the color weakness profile corresponding to the user of the user device, in response to the loaded color weakness profile, select one of the plurality of split-rendering servers, transmit a video content along with the color weakness profile to the selected split-rendering server, and transmit access information about the selected split-rendering server to the user device, the selected split-rendering server being configured to:

generate a color-corrected video from the video content based on the color weakness profile, and in response to accessing the selected split-rendering server using the access information by the user device, transmit the color-corrected video to the user device, wherein the service server that provides the video content, which is not color-corrected, is a different entity from the selected split-rendering server that provides the color-corrected video.

6. The system of claim 5, wherein the service server is further configured to update the color weakness profile by re-performing the color weakness test in response to a request of the user device after transmitting the color-corrected video to the user device, and transmit the updated color weakness profile to the selected split-rendering server, and the selected split-rendering server is further configured to regenerate a color-corrected video again by rendering the video content based on the updated color weakness profile, and transmit the regenerated color-corrected video to the user device.

7. The system of claim 5, wherein the service server is further configured to:

after performing the color weakness test, provide the user device with a sample video prepared by rendering based on the result of the color weakness test, and in response to a feedback from the user device that the provided sample video is not properly corrected, repeat the color weakness test to obtain an updated test result.

8. The system of claim 5, wherein the color-corrected video comprises a real-time interactive content that communicates two-way with the user device and is created by rendering in real time by applying color correction.

* * * * *